Sept. 13, 1949.    J. FOSTER    2,481,834
AXIALLY ENGAGING MULTIPLE DISK CLUTCH
Filed Feb. 10, 1948
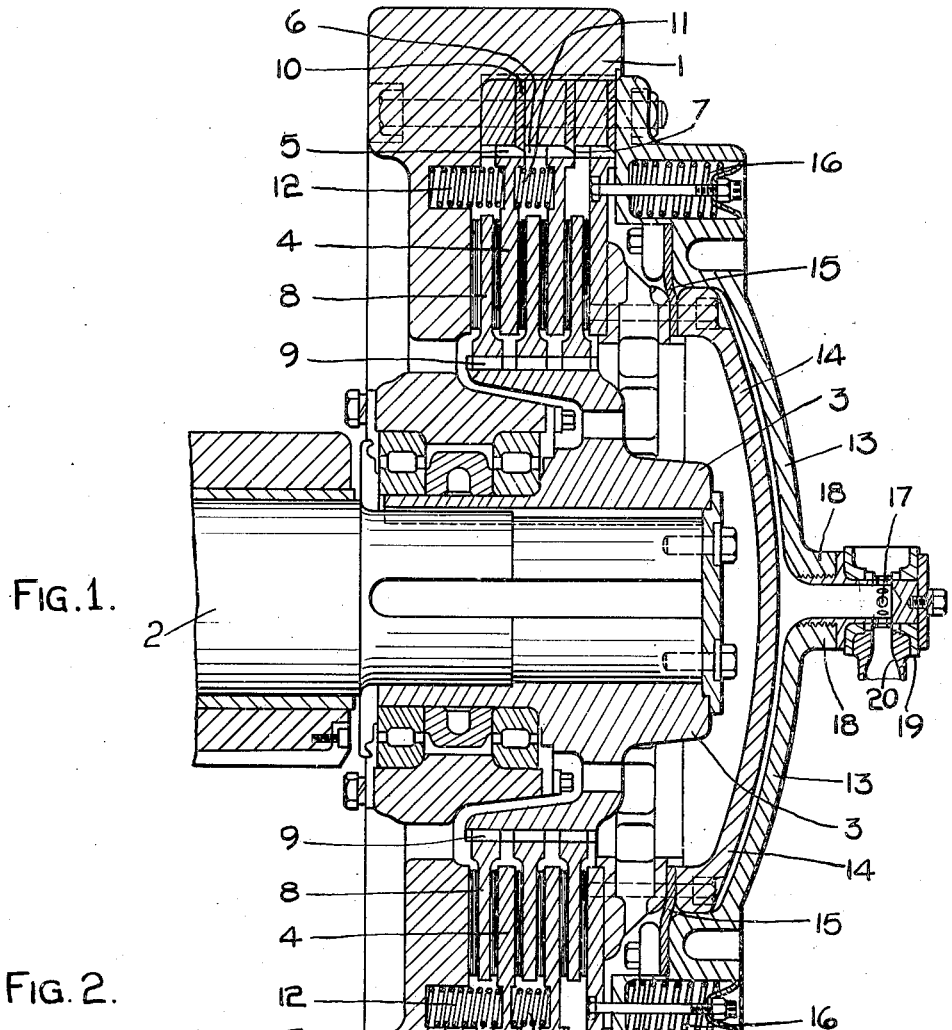
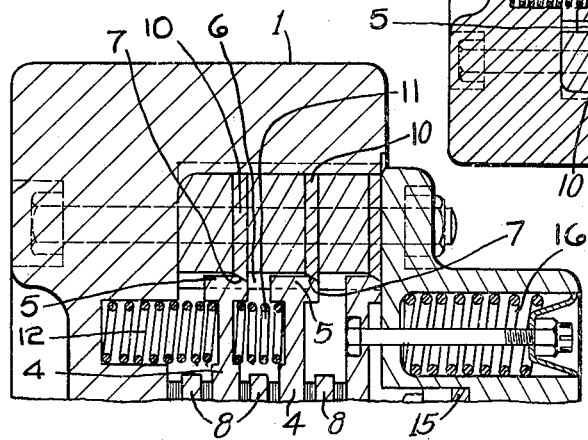
INVENTOR
John Foster
BY HIS ATTORNEYS Patented Sept. 13, 1949

2,481,834

UNITED STATES PATENT OFFICE 2,481,834

AXIALLY ENGAGING MULTIPLE DISK CLUTCH

John Foster, Denton, England, assignor to B. & S. Massey Limited, Openshaw, Manchester, England Application February 10, 1948, Serial No. 7,327
In Great Britain February 11, 1947

4 Claims. (Cl. 192—69)

This invention relates to improvements in friction clutches being applicable more particularly to friction clutches of the multi-plate type, but also applicable to clutches having a single driving plate and a single driven plate.

When a friction clutch of the multi-plate type as heretofore constructed is in disengaged or free running condition, the clutch plates enmeshed with the continuously rotating driver are allowed to run loose diametrically and axially to the extent of the working clearances.

In some cases springs are interposed between the plates to assist in breaking the suction effect on the flat surfaces and to hold the plates in correct spaced position in the free running condition.

It is necessary that the diametral clearance of large clutches should be considerable in order to allow for the expansion due to heating of the plates when taking up the load, and particularly so in clutches where the outer plates are the driving plates.

This relatively large clearance allows a movement of the plates in the splined housing to take place at every revolution when the clutch is disengaged, whereby a hammering effect is produced on the splines which in time causes indentation of the mating surfaces. This hammering effect is cumulative; as the indentation increases, so does the hammer blow on the splines, and so on, until there is a final break-down of the splines, or the indentations become such as to prevent axial movement of the plates and therefore correct engagement of the clutch. This hammering effect is very pronounced in clutches which run for much of their time with the plates in disengaged condition.

This invention overcomes the foregoing disadvantage by providing a clutch in which the driving plate or driving plates is or are spring held in or on a conical or wedge seating or seatings when the clutch is in the disengaged or free running condition.

The invention is applicable both to clutches in which the driving plates are furnished with external splines, e. g., splines on their outer periphery, and to clutches in which the driving plates are provided with internal splines.

A friction clutch according to the invention includes a driving clutch element freely mounted on the shaft or rotor to be driven and adapted to be rotated, a driven clutch element splined on said shaft or rotor, at least one driving plate formed with external splines engaging splines presented by the driving clutch element and having an external annular conical seating, at least one driven plate adapted to be moved against the driving plate and having splines engaging the driven clutch element, said driving clutch element being formed with an internal conical seating registering with the conical seating on the driving plate, whereby, when the clutch is in disengaged condition, the conical seating on the driving clutch element engages the conical seating on the driving plate and thus supports the driving plate.

Compression springs may be interposed between the driving plates and also between the driving clutch element and the adjacent driving plate.

In clutches having a multiplicity of driving and driven plates compression springs may be interposed between the driving plates and also between the driving clutch element and the adjacent driving plate.

Advantageously, the splines and conical seatings in the driving clutch element may be arranged as alternate rings bolted to one another and to said clutch element.

In a clutch operated by compressed air, the splines and conical seatings are also bolted to the air cylinder, and the outer plate immediately adjacent to the air cylinder is bolted to a piston slidable in the cylinder. Air inlet and exit means are provided as usual in the cylinder whereby the piston may be moved in one direction to press the friction plates together, compression springs being provided to return the air piston and the attached outer plate to initial position.

A practical embodiment of the invention is illustrated in the accompanying drawing in which Fig. 1 is a sectional view of a friction clutch constructed according to the invention and Fig. 2 a fragmentary sectional view, drawn to a larger scale, of a detail part of Fig. 1. In the drawings 1 denotes the driving clutch element freely mounted on the shaft 2. 3 denotes the driven clutch element splined to the shaft 2. 4 denotes the driving plates formed with external splines 5 engaging splines 6 on the driving clutch element 1, said driving plates 4 being each formed with an external annular conical seating 7. 8 denotes the driven plates formed with splines 9 engaging the driven clutch element 3. 10 denotes rings bolted to the driving clutch element and formed with conical seatings engageable with the conical seatings 7 on the driving plates 4. 11 denotes compression springs interposed between the driving plates 4, and 12 denotes compression springs interposed between the end driving plate 4 and the driving clutch element 1. 13 denotes an air cylinder in which is slidable a piston 14 bolted to the driving plates 4, leakage past the piston 14 being prevented by a flexible sealing ring 15. 16 denotes a drawback spring for returning the piston 14. 17 denotes compressed air inlet ports formed in an axial extension 18 of the cylinder 13. 19 denotes a ring encircling the part of the axial extension 18 formed with the ports 17, said ring being free on the extension 18 and being adapted to receive one end of an air hose 20. The driving element 1 is rotated by a belt wrapping the outer surface of said element.

In practice, when the driving clutch element 1 is rotating and it is desired to engage the clutch to cause the shaft 2 to rotate, air under pressure is admitted to the cylinder 13 which is rotating with the driving clutch element 1, the ring 19 remaining stationary. The piston 14 moves away from the cylinder 13 and moves the driving plates 4 and the driven plates 8 together, the splines 5 and 9 permitting axial movement of the plates 4 and 8, and transmitting the drive from the driving clutch element 1 to the driven clutch element 3 which is fixed on the shaft 2. To disengage the clutch, the air is released from the cylinder 13 and the springs 11, 12 and 16 move the driving plates 4 along the splines 6 out of engagement with the driven plates 8, thereby disengaging the clutch. The springs 11 and 12 move the driving plates 4 along the splines 6, until the annular conical seating 7 on each plate 4 engages the seating on the corresponding ring 10. The plates 4 are thus held rigidly while the clutch is disengaged.

A friction clutch as described embodying conical seatings and compression springs is entirely free from any hammering action on the splines when the clutch is running in disengaged condition with consequent increase in the working life of the clutch.

What is claimed is:

1. A friction clutch including a rotatable driving clutch element freely mounted on a rotor to be driven and presenting splines, a driven clutch element splined on said rotor, at least one driving plate formed with external splines engaging the splines presented by said driving clutch element and having an external annular conical seating, at least one driven plate adapted to be moved against said driving plate and having splines engaging said driven clutch element, said driving clutch element being provided with at least one internal conical seating registering with the external conical seating on said driving plate, and thus supporting said driving plate.

2. A friction clutch as claimed in claim 1 in which there is a multiplicity of driving and driven plates disposed alternately, and compression springs are interposed between the driving plates and also between the driving clutch element and the adjacent driving plate.

3. A friction clutch as claimed in claim 1 in which there is a multiplicity of driving and driven plates disposed alternately, and the splines presented by the driving clutch element and internal conical seatings are formed in alternate rings fastened to one another and to said driving clutch element.

4. A friction clutch as claimed in claim 1 in which there is a multiplicity of driving and driven plates disposed alternately, and the driving plates are operatively connected to a piston movable by fluid pressure.

JOHN FOSTER.

REFERENCES CITED

The following references are of record in the file of this patent:

UNITED STATES PATENTS

| Number | Name | Date |
| --- | --- | --- |
| 1,233,561 | Dornfield | July 17, 1917 |
| 2,089,733 | Criley | Aug. 10, 1937 |
| 2,241,242 | Friedman | May 6, 1941 |
| 2,354,604 | Newell | July 25, 1944 |